US012749687B2

(12) United States Patent
Kim et al.

(10) Patent No.: US 12,749,687 B2
(45) Date of Patent: *Sep. 29, 2026

(54) NEGATIVE ELECTRODE, SECONDARY BATTERY INCLUDING THE NEGATIVE ELECTRODE, AND METHOD OF PREPARING THE NEGATIVE ELECTRODE

(71) Applicant: LG Energy Solution, Ltd., Seoul (KR)

(72) Inventors: Tae Gon Kim, Daejeon (KR); Hyung Man Cho, Daejeon (KR); Il Jae Moon, Daejeon (KR); Sun Wook Park, Daejeon (KR); Min Kwak, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 19/372,715

(22) Filed: Oct. 29, 2025

(65) Prior Publication Data

US 2026/0058157 A1 Feb. 26, 2026

Related U.S. Application Data

(63) Continuation of application No. 19/065,082, filed on Feb. 27, 2025, now Pat. No. 12,494,490, which is a (Continued)

(30) Foreign Application Priority Data

Aug. 1, 2019 (KR) ........................ 10-2019-0094003

(51) Int. Cl.

| | |
|---|---|
| ***H01M 4/62*** | (2006.01) |
| ***H01M 4/134*** | (2010.01) |

(Continued)

(52) U.S. Cl.

CPC ........... *H01M 4/625* (2013.01); *H01M 4/134* (2013.01); *H01M 4/1395* (2013.01); (Continued)

(58) Field of Classification Search

CPC .... H01M 4/625; H01M 4/134; H01M 4/1395; H01M 4/366; H01M 4/483; H01M 4/622; (Continued)

(56) References Cited

U.S. PATENT DOCUMENTS

| | | |
|---|---|---|
| 6,183,714 B1 | 2/2001 | Smalley et al. |
| 7,338,915 B1 | 3/2008 | Smalley et al. |

(Continued)

FOREIGN PATENT DOCUMENTS

| | | |
|---|---|---|
| CN | 103261091 A | 8/2013 |
| CN | 104025348 A | 9/2014 |

(Continued)

OTHER PUBLICATIONS

Machine translation of JP 2017084759 A (Year: 2025).*

(Continued)

*Primary Examiner* — Maria Laios
*Assistant Examiner* — Ziheng Lu
(74) *Attorney, Agent, or Firm* — Lerner David LLP

(57) ABSTRACT

A negative electrode includes a negative electrode active material layer, wherein the negative electrode active material layer includes a negative electrode active material and a conductive agent, wherein the negative electrode active material includes a silicon-based active material, the silicon-based active material includes $SiO_x$ ($0 \le x < 2$), the conductive agent includes a carbon nanotube structure in which 2 to 5,000 single-walled carbon nanotube units are bonded side by side, and the carbon nanotube structure is included in an amount of 0.01 wt % to 1.0 wt % in the negative electrode active material layer. A secondary battery including the (Continued)

(A) (B) (C)

negative electrode, and a method of preparing same are also provided.

20 Claims, 3 Drawing Sheets

Related U.S. Application Data continuation of application No. 17/616,417, filed as application No. PCT/KR2020/010154 on Jul. 31, 2020, now Pat. No. 12,261,302.

(51) Int. Cl.
*H01M 4/1395* (2010.01)
*H01M 4/36* (2006.01)
*H01M 4/48* (2010.01)
*H01M 10/0525* (2010.01)
*H01M 4/02* (2006.01)

(52) U.S. Cl.
CPC ........... *H01M 4/366* (2013.01); *H01M 4/483* (2013.01); *H01M 4/622* (2013.01); *H01M 4/623* (2013.01); *H01M 10/0525* (2013.01); *H01M 2004/021* (2013.01); *H01M 2004/027* (2013.01); *H01M 2220/10* (2013.01); *H01M 2220/20* (2013.01)

(58) Field of Classification Search
CPC ............. H01M 4/623; H01M 10/0525; H01M 2004/021; H01M 2004/027; H01M 2220/10; H01M 2220/20
See application file for complete search history.

(56) References Cited

U.S. PATENT DOCUMENTS

| | | | | |
|---|---|---|---|---|
| 2005/0100497 | A1 | 5/2005 | Smalley et al. | |
| 2006/0008407 | A1 | 1/2006 | Smalley et al. | |
| 2009/0042100 | A1 | 2/2009 | Tanaka et al. | |
| 2009/0042136 | A1 * | 2/2009 | Tour | B82Y 10/00 430/311 |
| 2011/0171371 | A1 | 7/2011 | Li et al. | |
| 2011/0256451 | A1 * | 10/2011 | Cui | H10F 77/147 428/688 |
| 2012/0328946 | A1 * | 12/2012 | Bosnyak | H01M 6/00 427/113 |
| 2013/0200310 | A1 | 8/2013 | Rudhardt et al. | |
| 2013/0337707 | A1 | 12/2013 | Hata et al. | |
| 2014/0154564 | A1 | 6/2014 | Yoo et al. | |
| 2014/0287317 | A1 | 9/2014 | Tiquet et al. | |
| 2015/0311504 | A1 | 10/2015 | Hong et al. | |
| 2016/0020466 | A1 | 1/2016 | Ulbrich et al. | |
| 2016/0087270 | A1 | 3/2016 | Yoshikawa et al. | |
| 2017/0036914 | A1 | 2/2017 | Sohn et al. | |
| 2017/0170511 | A1 | 6/2017 | Yu et al. | |
| 2017/0309893 | A1 | 10/2017 | Kim et al. | |
| 2017/0365858 | A1 | 12/2017 | Yun et al. | |
| 2018/0016146 | A1 | 1/2018 | Hata et al. | |
| 2018/0062158 | A1 | 3/2018 | Kim et al. | |
| 2018/0226650 | A1 | 8/2018 | Yoo et al. | |
| 2018/0248195 | A1 | 8/2018 | Choi et al. | |
| 2019/0027740 | A1 | 1/2019 | Lee et al. | |
| 2019/0036186 | A1 | 1/2019 | Kim et al. | |
| 2020/0006772 | A1 | 1/2020 | Yu et al. | |
| 2022/0006077 | A1 | 1/2022 | Kim et al. | |
| 2022/0052320 | A1 | 2/2022 | Chen et al. | |
| 2022/0238886 | A1 | 7/2022 | Kim et al. | |

FOREIGN PATENT DOCUMENTS

| | | | |
|---|---|---|---|
| CN | 107634184 | A | 1/2018 |
| CN | 108028355 | A | 5/2018 |
| CN | 108064255 | A | 5/2018 |
| CN | 108701810 | A | 10/2018 |
| JP | 3958792 | B2 | 8/2007 |
| JP | 2014500212 | A | 1/2014 |
| JP | 5540341 | B2 | 7/2014 |
| JP | 2015167127 | A | 9/2015 |
| JP | 2017084759 | A | 5/2017 |
| JP | 2018501602 | A | 1/2018 |
| KR | 20140070406 | A | 6/2014 |
| KR | 20150122653 | A | 11/2015 |
| KR | 20150135090 | A | 12/2015 |
| KR | 20170030438 | A | 3/2017 |
| KR | 20210015714 | A | 2/2021 |
| WO | 2016011196 | A1 | 1/2016 |
| WO | 2017095151 | A1 | 6/2017 |

OTHER PUBLICATIONS

Carbon nanotube, single-walled, Tuball, 805033, Sigma-Aldrich, Merck KGaA, 2023. (Year: 2023).
Chinese Search Report from CN Appl. No. 202080041364.8, mailed Sep. 30, 2024, 2 pages.
Extended European Search Report for Application No. 20846853.8 dated Aug. 17, 2022. 7 pgs.
Industrial Quick Search, "Homogenizer", 2024: <https://www.iqsdirectory.com/articles/mixer/homogenizer.html> (Year: 2024).
International Search Report for Application No. PCT/KR2020/010154 mailed Nov. 6, 2020, 2 pages.
Liu, B. et al., "Dispersion of Single-Walled Carbon Nanotubes in Organic Solvents DMAC," Advanced Functional Materials, Apr. 2018, p. 841-852, Springer Nature Singapore Pte Ltd.
Third Party Observation for Application No. KR 20200096028 dated Jul. 28, 2023, pp. 1-2. (see p. 1, categorizing the cited references).

* cited by examiner (A) (B) (C)

(A)

(B)

(A) (B)

NEGATIVE ELECTRODE, SECONDARY BATTERY INCLUDING THE NEGATIVE ELECTRODE, AND METHOD OF PREPARING THE NEGATIVE ELECTRODE

CROSS-REFERENCE TO RELATED APPLICATIONS

This application is a continuation of U.S. application Ser. No. 19/065,082, filed on Feb. 27, 2025, which is a continuation of U.S. application Ser. No. 17/616,417, filed on Dec. 3, 2021, which is a national phase entry under U.S.C. § 371 of International Application No. PCT/KR2020/010154, filed on Jul. 31, 2020, which claims priority from Korean Patent Application No. 10-2019-0094003, filed on Aug. 1, 2019, the disclosures of which are incorporated by reference herein.

TECHNICAL FIELD

The present invention relates to a negative electrode, a secondary battery including the same, and a method of preparing the negative electrode, wherein the negative electrode includes a negative electrode active material layer, and the negative electrode active material layer includes a negative electrode active material and a conductive agent, wherein the negative electrode active material includes a silicon-based active material, the silicon-based active material includes $SiO_x$ ($0 \leq x < 2$), the conductive agent includes a carbon nanotube structure in which 2 to 5,000 single-walled carbon nanotube units are bonded side by side, and the carbon nanotube structure may be included in an amount of 0.01 wt % to 1.0 wt % in the negative electrode active material layer.

BACKGROUND

Demand for batteries as an energy source has been significantly increased as technology development and demand with respect to mobile devices have recently increased, and a variety of research on batteries capable of meeting various needs have been carried out accordingly. Particularly, as a power source for such devices, research into lithium secondary batteries having excellent lifetime and cycle characteristics as well as high energy density has been actively conducted.

A lithium secondary battery denotes a battery in which a non-aqueous electrolyte containing lithium ions is included in an electrode assembly which includes a positive electrode including a positive electrode active material capable of intercalating/deintercalating the lithium ions, a negative electrode including a negative electrode active material capable of intercalating/deintercalating the lithium ions, and a microporous separator disposed between the positive electrode and the negative electrode.

Since conductivity of the negative electrode may not be secured only by the negative electrode active material, resistance of the battery may be excessively high, and thus, the negative electrode typically additionally includes a conductive agent. Typically, a point-type conductive agent, such as carbon black, has mainly been used, and a line-type conductive agent, such as carbon nanotubes and carbon nanofibers, has also been used to improve capacity of the battery by further improving the conductivity.

A single-walled carbon nanotube is one of the line-type conductive agents, and conductivity in a negative electrode active material layer is improved due to its thin and elongated shape. Thus, typically, after a negative electrode slurry was prepared by using a dispersion in which the single-walled carbon nanotubes were completely dispersed, the negative electrode active material layer was prepared by using the negative electrode slurry.

However, when charge and discharge of the battery are repeated, the single-walled carbon nanotubes are broken as volume expansion and contraction of the negative electrode active material are repeated, and thus, it may be difficult to maintain a conductive network in the negative electrode active material layer. Particularly, in a case in which a silicon-based active material is used as a negative electrode active material to improve the capacity of the battery, since a volume of the silicon-based active material excessively expands due to charge and discharge of the battery, a phenomenon of breakage of the single-walled carbon nanotubes occurs more severely. Accordingly, the conductive network is blocked or reduced, and this degrades life characteristics of the battery.

Therefore, there is a need for a new negative electrode which may improve the capacity and lifetime of the battery when the silicon-based active material is used.

Technical Problem

An aspect of the present invention provides a negative electrode which may improve capacity and life characteristics of a battery.

Another aspect of the present invention provides a secondary battery including the negative electrode.

Another aspect of the present invention provides a method of preparing the negative electrode.

Technical Solution

According to an aspect of the present invention, there is provided a negative electrode including a negative electrode active material layer, wherein the negative electrode active material layer includes a negative electrode active material and a conductive agent, wherein the negative electrode active material includes a silicon-based active material, the silicon-based active material includes $SiO_x$ ($0 \leq x < 2$), the conductive agent includes a carbon nanotube structure in which 2 to 5,000 single-walled carbon nanotube units are bonded side by side, and the carbon nanotube structure is included in an amount of 0.01 wt % to 1.0 wt % in the negative electrode active material layer.

According to another aspect of the present invention, there is provided a method of preparing a negative electrode which includes the steps of: preparing a conductive agent dispersion (S1) and forming a negative electrode slurry including the conductive agent dispersion and a negative electrode active material (S2), wherein the preparing of the conductive agent dispersion (S1) includes preparing a mixed solution containing a dispersion medium, a dispersant, and bundle-type single-walled carbon nanotubes (S1-1); and dispersing the bundle-type single-walled carbon nanotubes by applying a shear force to the mixed solution by a homogenizer to form a carbon nanotube structure in which 2 to 5,000 single-walled carbon nanotube units are bonded side by side (S1-2), wherein the negative electrode active material includes a silicon-based active material, the silicon-based active material includes $SiO_x$ ($0 \leq x < 2$), and the carbon nanotube structure is included in an amount of 0.01 wt % to 1.0 wt % in the negative electrode active material layer.

According to another aspect of the present invention, there is provided a secondary battery including the negative electrode.

Advantageous Effects

Since a negative electrode according to the present invention is prepared by using a conductive agent dispersion in which bundle-type single-walled carbon nanotubes are appropriately dispersed by a homogenizer under specific conditions, carbon nanotube structures in the form of a rope (long fiber form) are connected to each other to form a network structure in the negative electrode. Accordingly, since the carbon nanotube structures may not be broken even by an excessive volume change of a silicon-based active material, a conductive path in a negative electrode active material layer may be maintained. Thus, when the negative electrode of the present invention is used, effects of improving battery capacity due to the use of the silicon-based active material and improving battery life characteristics by the carbon nanotube structures may be obtained.

DETAILED DESCRIPTION

Figure 1:
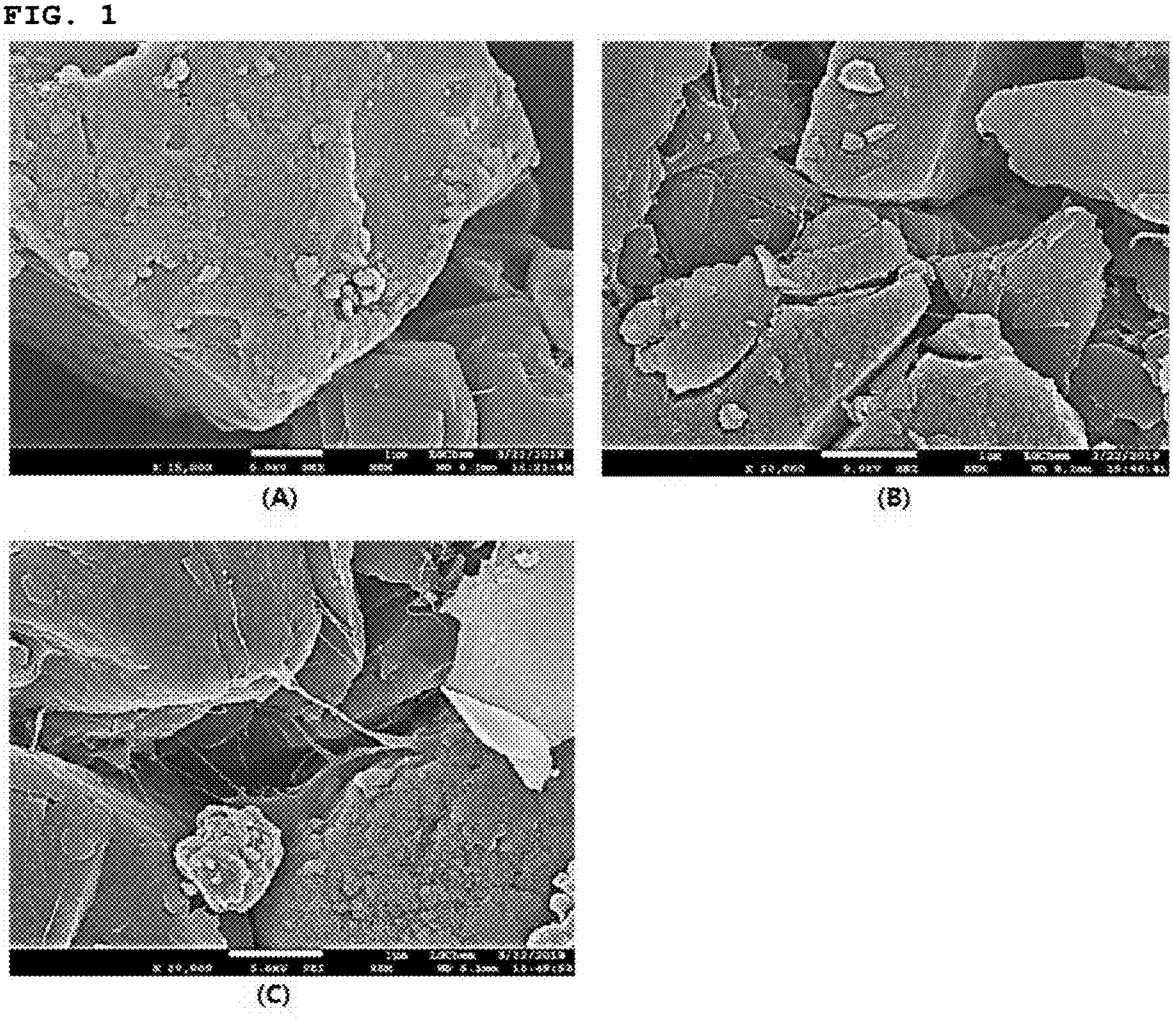
FIG. 1 is scanning electron microscope (SEM) images (A, B, and C) of an embodiment of a negative electrode in accordance with the present invention.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

In the present specification, the expression "%" denotes wt % unless explicitly stated otherwise.

In the present specification, the expression "specific surface area" is measured by a Brunauer-Emmett-Teller (BET) method, wherein, specifically, the specific surface area may be calculated from a nitrogen gas adsorption amount at a liquid nitrogen temperature (77K) using BELSORP-mini II by BEL Japan Inc.

The expression "average particle diameter ($D_{50}$)" in the present specification may be defined as a particle diameter at a cumulative volume of 50% in a particle size distribution curve. The average particle diameter ($D_{50}$), for example, may be measured by using a laser diffraction method. The laser diffraction method may generally measure a particle diameter ranging from a submicron level to a few mm and may obtain highly repeatable and high-resolution results.

Hereinafter, the present invention will be described in detail.

Negative Electrode

A negative electrode according to the present invention includes a negative electrode active material layer, wherein the negative electrode active material layer includes a negative electrode active material and a conductive agent, wherein the negative electrode active material includes a silicon-based active material, the silicon-based active material includes $SiO_x$ ($0 \leq x < 2$), the conductive agent includes a carbon nanotube structure in which 2 to 5,000 single-walled carbon nanotube units are bonded side by side, and the carbon nanotube structure may be included in an amount of 0.01 wt % to 1.0 wt % in the negative electrode active material layer.

The negative electrode may include a negative electrode active material layer, and may more specifically include a current collector and a negative electrode active material layer disposed on the current collector. However, the negative electrode does not exclude a so-called "free-standing negative electrode" in which the negative electrode is composed of only the negative electrode active material layer without the current collector.

The current collector is not particularly limited so long as it has conductivity without causing adverse chemical changes in the battery. For example, copper, stainless steel, aluminum, nickel, titanium, fired carbon, aluminum or stainless steel that is surface-treated with one of carbon, nickel, titanium, silver, or the like may be used as the current collector. Specifically, a transition metal that absorbs carbon well, such as copper and nickel, may be used as the current collector.

The negative electrode active material layer may be disposed on one surface or both surfaces of the current collector. Of course, with respect to the free-standing negative electrode, the negative active material layer by itself may also become the negative electrode without the current collector.

The negative electrode active material layer may include a negative electrode active material and a conductive agent.

The negative electrode active material may include a silicon-based active material.

The silicon-based active material may include $SiO_x$ ($0 \leq x < 2$). Accordingly, capacity of a battery may be increased.

The $SiO_x$ ($0 \leq x < 2$) may have an average particle diameter ($D_{50}$) of 0.1 μm to 20 μm, specifically, 1 μm to 10 μm. In a case in which the average particle diameter satisfies the above range, a side reaction between the $SiO_x$ ($0 \leq x < 2$) and an electrolyte solution may be suppressed, a decrease in initial efficiency may be prevented by controlling a lithium silicate formation reaction from the $SiO_x$ ($0 \leq x < 2$), and initial capacity of the battery may be maximized.

The silicon-based active material may further include a carbon coating layer. The carbon coating layer may be disposed on the $SiO_x$ ($0 \leq x < 2$). The carbon coating layer improves conductivity of the $SiO_x$ ($0 \leq x < 2$), and plays a role in suppressing an excessive volume expansion of the $SiO_x$ ($0 \leq x < 2$).

The carbon coating layer may include at least one of amorphous carbon and crystalline carbon.

The crystalline carbon may further improve the conductivity of the negative electrode active material. The crystalline carbon may include at least one selected from the group consisting of fullerenes, carbon nanotubes, and graphene.

The amorphous carbon may suppress expansion of natural graphite by appropriately maintaining strength of the coating layer. The amorphous carbon may be a carbide of at least one selected from the group consisting of tar, pitch, and other organic materials, or may be a carbon-based material formed by using a hydrocarbon as a source of chemical vapor deposition.

The carbide of the other organic materials may be a carbide of sucrose, glucose, galactose, fructose, lactose, mannose, ribose, aldohexose, or ketohexose, and a carbide of an organic material selected from a combination thereof.

The hydrocarbon may be a substituted or unsubstituted aliphatic or alicyclic hydrocarbon, or a substituted or unsubstituted aromatic hydrocarbon. The aliphatic or alicyclic hydrocarbon of the substituted or unsubstituted aliphatic or alicyclic hydrocarbon may include methane, ethane, ethylene, acetylene, propane, butane, butene, pentane, isobutane, or hexane. The substituted or unsubstituted aromatic hydrocarbon may include benzene, toluene, xylene, styrene, ethylbenzene, diphenylmethane, naphthalene, phenol, cresol, nitrobenzene, chlorobenzene, indene, coumarone, pyridine, anthracene, or phenanthrene.

The silicon-based active material may have an average particle diameter ($D_{50}$) of 0.1 μm to 20 μm, specifically, 1 μm to 10 μm. In a case in which the average particle diameter satisfies the above range, the side reaction between the $SiO_x$ ($0 \leq x < 2$) and the electrolyte solution may be suppressed, the decrease in initial efficiency may be prevented by controlling the lithium silicate formation reaction from the $SiO_x$ ($0 \leq x < 2$), and the initial capacity of the battery may be maximized.

The negative electrode active material may further include a carbon-based active material. The carbon-based active material may include at least one selected from the group consisting of artificial graphite, natural graphite, and graphitized mesocarbon microbeads. Specifically, in terms of the fact that artificial graphite may effectively control the volume expansion of the negative electrode while maintaining an electrical network with a carbon nanotube structure to be described later, the carbon-based active material may be the artificial graphite, but the carbon-based active material is not limited thereto.

A weight ratio of the silicon-based active material to the carbon-based active material may be in a range of 0.5:99.5 to 20:80, specifically, 1:99 to 10:90. In a case in which the above range is satisfied, capacity of the battery may be improved while an excessive volume expansion of the silicon-carbon composite particle may be suppressed.

The negative electrode active material may be included in an amount of 90 wt % to 99 wt %, specifically, 95 wt % to 99 wt % in the negative electrode active material layer. In a case in which the above range is satisfied, energy density of the negative electrode may be highly maintained, and conductivity and adhesiveness of the negative electrode may be improved.

The conductive agent may include a carbon nanotube structure.

The carbon nanotube structure may include a plurality of single-walled carbon nanotube units. Specifically, the carbon nanotube structure may be a carbon nanotube structure in which 2 to 5,000 single-walled carbon nanotube units are bonded side by side to each other, and, more specifically, the carbon nanotube structure may be a carbon nanotube structure in which 2 to 4,500 single-walled carbon nanotube units are bonded to each other. Even more specifically, in consideration of dispersibility of the carbon nanotube structure and durability of the electrode, it is most desirable that the carbon nanotube structure is a carbon nanotube structure in which 2 to 50 single-walled carbon nanotube units are bonded to each other.

In the carbon nanotube structure, the single-walled carbon nanotube units may be arranged side by side and bonded (cylindrical structure in which long axes of the units are bonded in parallel with each other to have flexibility) to form the carbon nanotube structure. The carbon nanotube structures may be connected to each other to represent a network structure in the electrode.

Conventional electrodes including carbon nanotubes are generally prepared by dispersing bundle-type or entangled-type carbon nanotubes (form in which single-walled carbon nanotube units or multi-walled carbon nanotube units are attached to each other or intertwined) in a dispersion medium to prepare a conductive agent dispersion and then using the conductive agent dispersion. In this case, the carbon nanotubes are completely dispersed in the conventional conductive agent dispersion to exist as a conductive agent dispersion in which carbon nanotube units in the form of a single strand are dispersed. In this case, in the conventional conductive agent dispersion, the carbon nanotube units are easily cut by an excessive dispersion process so that the carbon nanotube units have a length shorter than an initial length. Also, the carbon nanotube units may also be easily cut in a rolling process of the negative electrode, and an additional limitation occurs in which the carbon nanotube units (particularly, single-walled carbon nanotube units) are cut by an excessive volume change of the silicon-based active material during operation of the battery. Accordingly, conductivity of the negative electrode may be reduced to degrade life characteristics of the battery. Furthermore, with respect to the multi-walled carbon nanotube unit, structural defects are high due to a mechanism of node growth (not a smooth linear shape, but nodes are present due to defects generated during a growth process). Thus, during the dispersion process, the multi-walled carbon nanotube units are more easily cut, and the short-cut multi-walled carbon nanotube units are likely to be aggregated with each other via x-x stacking of carbons of the unit. Accordingly, it is difficult for the multi-walled carbon nanotube units to be more uniformly dispersed and present in an electrode slurry.

Alternatively, with respect to the carbon nanotube structure included in the negative electrode of the present invention, since it is in the form of a rope in which 2 to 5,000 single-walled carbon nanotube units, which maintain high crystallinity relatively without structural defects, are bonded side by side to each other, its length may be well maintained without being cut even by the excessive volume change of the silicon-carbon composite particle, and thus, the conductivity of the electrode may be maintained. Also, since the conductivity of the electrode is increased due to high conductivity of the single-walled carbon nanotube unit having high crystallinity, input characteristics, output characteristics, and life characteristics of the battery may be significantly improved. Furthermore, since the carbon nanotube structures may be connected to each other to have a network structure in the electrode, occurrence of cracks may be prevented by suppressing the excessive volume change of the silicon-based active material (see A of FIG. 1) and, simultaneously, a strong conductive network may be secured. Also, even if cracks occur in the silicon-based active material, since the carbon nanotube structure connects the silicon-based active material while crossing the crack, the conductive network may be maintained (see B of FIG. 1). Furthermore, since the carbon nanotube structure is not easily broken and may maintain its long shape, the conductive network may be strengthened throughout the negative electrode active material layer (see C of FIG. 1). Also, exfoliation of the silicon-based active material may be suppressed to significantly improve electrode adhesion.

In the carbon nanotube structure, the single-walled carbon nanotube unit may have an average diameter of 0.5 nm to 10 nm, specifically, 1 nm to 9 nm. In a case in which the average diameter is satisfied, there is an effect of maximizing the conductivity in the electrode even with a very small amount of the conductive agent. The average diameter corresponds to an average value of diameters of top 100 single-walled carbon nanotubes having a large diameter and bottom 100 single-walled carbon nanotubes having a small diameter when the prepared electrode is observed by a transmission electron microscope (TEM).

In the carbon nanotube structure, the single-walled carbon nanotube unit may have an average length of 1 μm to 100 μm, specifically, 5 μm to 50 μm. In a case in which the average length is satisfied, since a long conductive path for conductive connection between negative electrode active material particles may be formed and a unique network structure may be formed, there is an effect of maximizing the conductivity in the electrode even with a very small amount of the conductive agent. The average length corresponds to an average value of lengths of top 100 single-walled carbon nanotubes having a large length and bottom 100 single-walled carbon nanotubes having a small length when the prepared electrode is observed by a TEM.

The single-walled carbon nanotube unit may have a Brunauer-Emmett-Teller (BET) specific surface area of 500 $m^2/g$ to 1,000 $m^2/g$, specifically, 600 $m^2/g$ to 800 $m^2/g$. When the above range is satisfied, since the conductive path in the electrode may be smoothly secured due to the large specific surface area, there is an effect of maximizing the conductivity in the electrode even with a very small amount of the conductive agent. The specific surface area of the single-walled carbon nanotube unit may be calculated from a nitrogen gas adsorption amount at a liquid nitrogen temperature (77K) using BELSORP-mini II by BEL Japan Inc.

The carbon nanotube structure may have an average diameter of 2 nm to 200 nm, particularly 5 nm to 150 nm, and more particularly 5 nm to 50 nm. When the above range is satisfied, since it is effective in forming the conductive network structure and is advantageous for the connection between the active material particles, excellent electrical conductivity may be achieved. The average diameter corresponds to an average value of diameters of top 100 carbon nanotube structures having a large diameter and bottom 100 carbon nanotube structures having a small diameter when the prepared electrode is observed by a scanning electron microscope (SEM).

The carbon nanotube structure may have an average length of 1 μm to 100 μm, specifically, 5 μm to 50 μm. When the above range is satisfied, since it is effective in forming the conductive network structure and is advantageous for the connection between the active material particles, excellent electrical conductivity may be achieved. The average length corresponds to an average value of lengths of top 100 carbon nanotube structures having a large length and bottom 100 carbon nanotube structures having a small length when the prepared electrode is observed by an SEM.

The carbon nanotube structure may be included in an amount of 0.01 wt % to 1.0 wt %, particularly 0.01 wt % to 0.5 wt %, and more particularly 0.08 wt % to 0.3 wt % in the negative electrode active material layer. When the above range is satisfied, since the conductive path of the negative electrode may be secured, the life characteristics of the battery may be improved while a low level of electrode resistance is maintained. In a case in which the bundle-type carbon nanotubes are completely dispersed (as a general dispersion method, dispersion is performed so that single strands of the carbon nanotube units are separated from each other as much as possible) during the preparation of the conductive agent dispersion, the carbon nanotube structure is not formed, or, even if the carbon nanotube structure is formed unintentionally, the carbon nanotube structure is formed in a very small amount (e.g., 0.0005 wt %). That is, the above amount range may never be achieved by a general method.

With respect to the related art in which the negative electrode includes multi-walled carbon nanotube units, a large amount (e.g., greater than 0.5 wt %) of the multi-walled carbon nanotube units had to be used to compensate for low conductivity of the multi-walled carbon nanotube unit. Also, in a case in which the negative electrode is prepared by using a conductive agent dispersion in which single-walled carbon nanotube units are completely dispersed, the single-walled carbon nanotube units may not be used in a small amount because the single-walled carbon nanotube units may be cut.

In contrast, the carbon nanotube structure included in the negative electrode of the present invention has a form in which 2 to 5,000 single-walled carbon nanotube units are bonded side by side to each other. Thus, the carbon nanotube structure is not cut even by the excessive volume change of the silicon-based active material and may well maintain its length. Thus, the conductivity of the negative electrode may be maintained and the conductivity of the negative electrode may be smoothly secured due to the high conductivity of the single-walled carbon nanotube unit. Accordingly, the capacity and life characteristics of the battery may be excellent even if the amount of the carbon nanotube structure in the negative electrode is low.

In some cases, the single-walled carbon nanotube unit may be surface-treated by an oxidation treatment or nitridation treatment to improve affinity with a dispersant.

The negative electrode active material layer may further include carboxymethyl cellulose (CMC). The carboxymethyl cellulose may be a material which starts to be included in the negative electrode from the conductive agent dispersion required for the preparation of a negative electrode slurry, and, also, may be additionally added to reinforce the role of a binder during the preparation of the negative electrode slurry.

The carboxymethyl cellulose may have a weight-average molecular weight of 50,000 g/mol to 150,000 g/mol, specifically, 90,000 g/mol to 110,000 g/mol. In a case in which the above range is satisfied, since the carboxymethyl cellulose may easily penetrate between the single-walled carbon nanotube units in the bundle-type carbon nanotubes, appropriate dispersion of the bundle-type carbon nanotubes is possible and phase stability of the conductive agent dispersion may be improved. Accordingly, the conductivity of the negative electrode prepared may be significantly improved and input/output characteristics and life performance of the battery may be improved.

A degree of substitution of the carboxymethyl cellulose may be in a range of 0.1 to 3, specifically, 0.5 to 2. The degree of substitution means a degree to which a hydroxy group of the carboxymethyl cellulose is substituted with functional group A. The degree of substitution represents a degree to which the hydroxy group is substituted with the functional group A in a molecular structure of the carboxymethyl cellulose, that is, a degree of substitution of the hydroxy group with the functional group A. Specifically, if one of three hydroxy groups present in one repeating unit is substituted with the functional group A, a degree of substitution of the repeating unit is 1, if all three hydroxy groups are substituted with the functional group A, the degree of substitution of the repeating unit is 3, and, if all three hydroxy groups are not substituted, the degree of substitution of the repeating unit is 0. In the carboxymethyl cellulose, the degree of substitution of the hydroxy group with the functional group A represents an average value of the degree of substitution of each repeating unit. In addition, the functional group A may include at least one of —$CH_2CO_2Na$ and —$CH_2CO_2H$.

In a case in which the carboxymethyl cellulose has the above degree of substitution, since the functional groups A may smoothly interact with the single-walled carbon nanotube units, dispersibility of the carbon nanotube structure may be improved. Accordingly, the electrode adhesion may be further improved and the life characteristics of the battery may be improved.

The negative electrode active material layer may further include a binder. The binder is to secure adhesion between the negative electrode active material particles or between the negative electrode active material and the current collector, wherein common binders used in the art may be used, and a type thereof is not particularly limited. The binder, for example, may include a polyvinylidene fluoride-hexafluoropropylene copolymer (PVDF-co-HFP), polyvinyl alcohol, polyacrylonitrile, starch, hydroxypropyl cellulose, regenerated cellulose, polyvinylpyrrolidone, tetrafluoroethylene, polyethylene, polypropylene, an ethylene-propylene-diene polymer (EPDM), a sulfonated EPDM, carboxymethyl cellulose (CMC), a styrene-butadiene rubber (SBR), a fluoro rubber, or various copolymers thereof, and one alone or a mixture of two or more thereof may be used.

The binder may be included in an amount of 10 wt % or less, preferably, 0.1 wt % to 5 wt % based on a total weight of the electrode active material layer. In a case in which the amount of the binder satisfies the above range, excellent electrode adhesion may be achieved while minimizing an increase in resistance of the electrode.

Method of Preparing Negative Electrode

Next, a method of preparing a negative electrode of the present invention will be described.

The method of preparing a negative electrode of the present invention includes the steps of: preparing a conductive agent dispersion (S1) and forming a negative electrode slurry including the conductive agent dispersion and a negative electrode active material (S2), wherein the preparing of the conductive agent dispersion (S1) includes preparing a mixed solution containing a dispersion medium, a dispersant, and bundle-type single-walled carbon nanotubes (S1-1); and dispersing the bundle-type single-walled carbon nanotubes by applying a shear force to the mixed solution by a homogenizer to form a carbon nanotube structure in which 2 to 5,000 single-walled carbon nanotube units are bonded side by side (S1-2), wherein the negative electrode active material includes a silicon-based active material, the silicon-based active material includes $SiO_x$ ($0 \leq x < 2$), and the carbon nanotube structure may be included in an amount of 0.01 wt % to 1.0 wt % in the negative electrode active material layer. The negative electrode of the above-described embodiment may be prepared by the above method.

(1) Preparing Conductive Agent Dispersion (S1)

The preparing of the conductive agent dispersion (S1) may include: preparing a mixed solution containing a dispersion medium, a dispersant, and bundle-type single-walled carbon nanotubes (S1-1); and dispersing the bundle-type single-walled carbon nanotubes by applying a shear force to the mixed solution by a homogenizer to form a carbon nanotube structure in which 2 to 5,000 single-walled carbon nanotube units are bonded side by side (S1-2).

In step S1-1, the mixed solution may be prepared by adding the bundle-type carbon nanotubes and the dispersant to the dispersion medium. In the bundle-type carbon nanotube, the above-described single-walled carbon nanotube units are bonded to be present in the form of a bundle, wherein the bundle-type carbon nanotube includes usually 2 or more, substantially 500 or more, for example, 5,000 or more single-walled carbon nanotube units.

The bundle-type single-walled carbon nanotube may have a specific surface area of 500 $m^2/g$ to 1,000 $m^2/g$, specifically, 600 $m^2/g$ to 800 $m^2/g$. When the above range is satisfied, since the conductive path in the electrode may be smoothly secured due to the large specific surface area, there is an effect of maximizing the conductivity in the electrode even with a very small amount of the conductive agent.

The bundle-type single-walled carbon nanotubes may be included in an amount of 0.1 wt % to 1.0 wt %, specifically, 0.2 wt % to 0.5 wt % in the mixed solution. When the above range is satisfied, since the bundle-type single-walled carbon nanotubes are dispersed in an appropriate level, an appropriate level of the carbon nanotube structure may be formed, and dispersion stability may be improved.

The dispersion medium, for example, may include water ($H_2O$) and amide-based polar organic solvents such as dimethylformamide (DMF), diethyl formamide, dimethyl acetamide (DMAc), and N-methyl pyrrolidone (NMP); alcohols such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol, or octanol; glycols such as ethylene glycol, diethylene glycol, triethylene glycol, propylene glycol, 1,3-propanediol, 1,3-butanediol, 1,5-pentanediol, or hexylene glycol; polyhydric alcohols such as glycerin, trimethylolpropane, pentaerythritol, or sorbitol; glycol ethers such as ethylene glycol mono methyl ether, diethylene glycol mono methyl ether, triethylene glycol mono methyl ether, tetra ethylene glycol mono methyl ether, ethylene glycol mono ethyl ether, diethylene glycol mono ethyl ether, triethylene glycol mono ethyl ether, tetra ethylene glycol mono ethyl ether, ethylene glycol mono butyl ether, diethylene glycol mono butyl ether, triethylene glycol mono butyl ether, or tetra ethylene glycol mono butyl ether; ketones such as acetone, methyl ethyl ketone, methylpropyl ketone, or cyclopentanone; and esters such as ethyl acetate, γ-butyl lactone, and ε-propiolactone, and any one thereof or a mixture of two or more thereof may be used, but the present invention is not limited thereto. More specifically, the dispersion medium may be N-methyl pyrrolidone (NMP).

The dispersant may include at least one selected from the group consisting of a hydrogenated nitrile butadiene rubber, polyvinylidene fluoride, polystyrene, polyvinylpyrrolidone, polyvinyl alcohol, pyrene butyric acid, pyrene sulfonic acid, tannic acid, pyrene methylamine, sodium dodecyl sulfate, and carboxymethyl cellulose, and may specifically include at least one of carboxymethyl cellulose, polyvinylidene fluoride, polyvinylpyrrolidone, and a hydrogenated nitrile butadiene rubber. Particularly, the dispersant may include carboxymethyl cellulose. Since the carboxymethyl cellulose is the same as the carboxymethyl cellulose described in relation to the negative electrode of the above-described embodiment, descriptions thereof will be omitted.

A weight ratio of the bundle-type carbon nanotubes to the dispersant in the conductive agent dispersion may be in a range of 1:0.1 to 1:10, specifically, 1:1 to 1:10. In a case in which the above range is satisfied, since the bundle-type single-walled carbon nanotubes are dispersed in an appropriate level, an appropriate level of the carbon nanotube structure may be formed, and the dispersion stability may be improved.

A solid content in the mixed solution may be in a range of 0.1 wt % to 20 wt %, specifically, 1 wt % to 10 wt %. In a case in which the above range is satisfied, since the bundle-type single-walled carbon nanotubes are dispersed in an appropriate level, an appropriate level of the carbon nanotube structure may be formed, and the dispersion stability may be improved. Also, the negative electrode slurry may have viscosity and elasticity that are suitable for an electrode preparation process, and it also contributes to an increase in the solid content of the negative electrode slurry.

In step S1-2, the mixed solution may be stirred by a homogenizer, and, in this process, the bundle-type single-walled carbon nanotubes may be dispersed to form a carbon nanotube structure. In the carbon nanotube structure, 2 to 5,000 single-walled carbon nanotube units are bonded side by side, wherein the carbon nanotube structure is the same as the carbon nanotube structure described in relation to the negative electrode of the above-described embodiment.

The homogenizer may include a first nozzle and a second nozzle. The mixed solution sequentially passes through the first nozzle and the second nozzle while a pressure is applied to the mixed solution. Since a diameter of the second nozzle is smaller than a diameter of the first nozzle, the mixed solution is subjected to a shear force while passing through the nozzles, and, in this case, the bundle-type single-walled carbon nanotubes are dispersed.

The diameter of the first nozzle may be in a range of 100 mm to 500 mm, particularly 150 mm to 300 mm, and more particularly 150 mm to 250 mm. The diameter of the second nozzle may be in a range of 100 μm to 1,000 μm, particularly 200 μm to 800 μm, and more particularly 200 μm to 650 μm. Also, the pressure may be in a range of 500 Bar to 1,800 Bar, particularly 500 Bar to 1,600 Bar, and more particularly 800 Bar to 1,600 Bar. If the pressure is 1,800 Bar or more, since the bundle-type single-walled carbon nanotubes are completely dispersed, the carbon nanotube structure may not be smoothly formed.

In step S1, different from a conventional method that completely disperses the bundle-type single-walled carbon nanotubes, the bundle-type single-walled carbon nanotubes are not completely dispersed, but are dispersed in an appropriate level by appropriately combining conditions, for example, conditions for using the homogenizer (nozzle size, pressure, etc.), physical properties of the bundle-type single-walled carbon nanotubes used, and the dispersant used. Accordingly, in the conductive agent dispersion formed, there is no or almost no single-walled carbon nanotube unit independently present in a single-stranded form, and most of the bundle-type single-walled carbon nanotubes may be present as the above-described carbon nanotube structure.

(2) Forming Negative Electrode Slurry Including the Conductive Agent Dispersion and Negative Electrode Active Material (S2)

When the conductive agent dispersion is prepared by the above-described process, a negative electrode active material is mixed with the conductive agent dispersion to form a negative electrode slurry. In this case, the above-described negative electrode active materials may be used as the negative electrode active material.

Also, the negative electrode slurry may further include a binder and a solvent, if necessary. In this case, the binder of the above-described embodiment may be used as the binder. The solvent, for example, may include amide-based polar organic solvents such as dimethylformamide (DMF), diethyl formamide, dimethyl acetamide (DMAc), and N-methyl pyrrolidone (NMP); alcohols such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol, or octanol; glycols such as ethylene glycol, diethylene glycol, triethylene glycol, propylene glycol, 1,3-propanediol, 1,3-butanediol, 1,5-pentanediol, or hexylene glycol; polyhydric alcohols such as glycerin, trimethylolpropane, pentaerythritol, or sorbitol; glycol ethers such as ethylene glycol mono methyl ether, diethylene glycol mono methyl ether, triethylene glycol mono methyl ether, tetra ethylene glycol mono methyl ether, ethylene glycol mono ethyl ether, diethylene glycol mono ethyl ether, triethylene glycol mono ethyl ether, tetra ethylene glycol mono ethyl ether, ethylene glycol mono butyl ether, diethylene glycol mono butyl ether, triethylene glycol mono butyl ether, or tetra ethylene glycol mono butyl ether; ketones such as acetone, methyl ethyl ketone, methylpropyl ketone, or cyclopentanone; and esters such as ethyl acetate, γ-butyl lactone, and s-propiolactone, and any one thereof or a mixture of two or more thereof may be used, but the present invention is not limited thereto. The solvent may be the same or different from the dispersion medium used in the pre-dispersion, and may preferably be N-methyl pyrrolidone (NMP).

The negative electrode active material includes a silicon-based active material, and the silicon-based active material may include $SiO_x$ ($0 \leq x < 2$). The negative electrode active material is the same as the negative electrode active material described in relation to the negative electrode of the above-described embodiment.

The negative electrode active material may be included in an amount of 70 wt % to 99.5 wt %, preferably, 80 wt % to 90 wt % based on a total solid content in the negative electrode slurry. When the amount of the negative electrode active material satisfies the above range, excellent energy density, electrode adhesion, and electrical conductivity may be achieved.

Also, in a case in which the binder is further included, the binder may be included in an amount of 10 wt % or less, specifically, 0.1 wt % to 5 wt % based on the total solid content in the negative electrode slurry.

The solid content in the negative electrode slurry may be in a range of 40 wt % to 80 wt %, specifically, 40 wt % to 60 wt %. In a case in which the above range is satisfied, migration of the conductive agent and the binder due to evaporation of the solvent may be suppressed during drying after negative electrode slurry coating, and a negative electrode having excellent electrode adhesion and electrical conductivity may be prepared. Furthermore, a high-quality negative electrode with less deformation during rolling may be prepared.

The carbon nanotube structure may be included in an amount of 0.01 wt % to 1.0 wt %, specifically, 0.01 wt % to 0.5 wt % in the solid content of the negative electrode slurry. When the above range is satisfied, since the conductive path of the electrode may be secured, the life characteristics of the battery may be improved while the electrode resistance is maintained at a low level.

Next, a negative electrode active material layer is formed by drying the negative electrode slurry prepared as described above. Specifically, the negative electrode active material layer may be formed by a method of coating an electrode collector with the negative electrode slurry and then drying the coated collector, or may be formed by a method of casting the negative electrode slurry on a separate support and then laminating a film separated from the support on the negative electrode collector. If necessary, after the negative electrode active material layer is formed by the above-described method, a rolling process may be further performed. In this case, the drying and rolling may be performed under appropriate conditions in consideration of physical properties of the electrode to be finally prepared, and are not particularly limited. The carbon nanotube structure may be included in an amount of 0.01 wt % to 1.0 wt % in the <Secondary Battery>

Next, a secondary battery according to another embodiment of the present invention will be described.

The secondary battery according to another embodiment of the present invention may include the negative electrode of the above-described embodiment.

Specifically, the secondary battery may include the negative electrode, a positive electrode, a separator disposed between the positive electrode and the negative electrode, and an electrolyte, wherein the negative electrode is the same as the negative electrode of the above-described embodiment. Since the negative electrode has been described above, detailed descriptions thereof will be omitted.

The positive electrode may include a positive electrode collector and a positive electrode active material layer which is formed on the positive electrode collector and includes a positive electrode active material.

In the positive electrode, the positive electrode collector is not particularly limited as long as it has conductivity without causing adverse chemical changes in the batteries, and, for example, stainless steel, aluminum, nickel, titanium, fired carbon, or aluminum or stainless steel that is surface-treated with one of carbon, nickel, titanium, or silver may be used. Also, the positive electrode collector may typically have a thickness of 3 μm to 500 μm and may have a surface with fine roughness to improve adhesion to the positive electrode active material. The positive electrode collector may be used in various shapes, for example, a film, a sheet, a foil, a net, a porous body, a foam body, a non-woven fabric body, and the like.

The positive electrode active material may be a typically used positive electrode active material. Specifically, the positive electrode active material may include a layered compound, such as lithium cobalt oxide ($LiCoO_2$) or lithium nickel oxide ($LiNiO_2$), or a compound substituted with one or more transition metals; lithium iron oxides such as $LiFe_3O_4$; lithium manganese oxides such as $Li_{1+c1}Mn_{2-c1}O_4$ ($0 \leq c1 \leq 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; nickel (Ni)-site type lithium nickel oxide expressed by a chemical formula of $LiNi_{1-c2}M_{c2}O_2$ (where M is at least one selected from the group consisting of cobalt (Co), manganese (Mn), aluminum (Al), copper (Cu), iron (Fe), magnesium (Mg), boron (B), and gallium (Ga), and c2 satisfies $0.01 \leq c2 \leq 0.3$); lithium manganese composite oxide expressed by a chemical formula of $LiMn_{2-c3}Mc_3O_2$ (where M is at least one selected from the group consisting of Co, Ni, Fe, chromium (Cr), zinc (Zn), and tantalum (Ta), and c3 satisfies $0.01 \leq c3 \leq 0.1$) or $Li_2Mn_3MO_8$ (where M is at least one selected from the group consisting of Fe, Co, Ni, Cu, and Zn); and $LiMn_2O_4$ having a part of Li being substituted with alkaline earth metal ions, but the positive electrode active material is not limited thereto. The positive electrode may be Li-metal.

The positive electrode active material layer may include a positive electrode conductive agent and a positive electrode binder as well as the above-described positive electrode active material.

In this case, the positive electrode conductive agent is used for providing conductivity to the electrode, wherein any conductive agent may be used without particular limitation as long as it has electronic conductivity without causing adverse chemical changes in the battery. Specific examples of the positive electrode conductive agent may be graphite such as natural graphite and artificial graphite; a carbon-based material such as carbon black, acetylene black, Ketjen black, channel black, furnace black, lamp black, thermal black, and carbon fibers; metal powder, such as copper powder, nickel powder, aluminum powder, and silver powder, or metal fibers; conductive whiskers such as zinc oxide whiskers and potassium titanate whiskers; conductive metal oxide such as titanium oxide; or conductive polymers such as polyphenylene derivatives, and one alone or a mixture of two or more thereof may be used.

Also, the positive electrode binder functions to improve binding between positive electrode active material particles and adhesion between the positive electrode active material and the positive electrode collector. Specific examples of the positive electrode binder may be polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber (SBR), a fluoro rubber, or various copolymers thereof, and one alone or a mixture of two or more thereof may be used.

The separator separates the negative electrode and the positive electrode and provides a movement path of lithium ions, wherein any separator may be used as the separator without particular limitation as long as it is typically used in a secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer component may be used to secure heat resistance or mechanical strength, and the separator having a single layer or multilayer structure may be selectively used.

The electrolyte may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include a non-aqueous organic solvent and a metal salt.

Examples of the non-aqueous organic solvent may be aprotic organic solvents, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydroxy franc, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

In particular, ethylene carbonate and propylene carbonate, ring-type carbonates among the carbonate-based organic solvents, well dissociate a lithium salt in the electrolyte solution due to high dielectric constants as high-viscosity organic solvents, and thus, the ring-type carbonate may be preferably used. Since an electrolyte solution having high electrical conductivity may be prepared when the ring-type carbonate is mixed with low-viscosity, low-dielectric constant linear carbonate, such as dimethyl carbonate and diethyl carbonate, in an appropriate ratio, the ring-type carbonate may be more preferably used.

A lithium salt may be used as the metal salt, and the lithium salt is a material that is readily soluble in the non-aqueous electrolyte solution, wherein, for example, any one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3$—, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

At least one additive, for example, a haloalkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the above-described electrolyte components for the purpose of improving life characteristics of the battery, preventing a decrease in battery capacity, and improving discharge capacity of the battery.

According to another embodiment of the present invention, a battery module including the secondary battery as a unit cell and a battery pack including the battery module are provided. Since the battery module and the battery pack include the secondary battery having high capacity, high rate capability, and high cycle characteristics, the battery module and the battery pack may be used as a power source of a medium and large sized device selected from the group consisting of an electric vehicle, a hybrid electric vehicle, a plug-in hybrid electric vehicle, and a power storage system.

Hereinafter, the present invention will be described in more detail, according to specific examples.

Preparation Example 1: Preparation of Conductive Agent Dispersion 0.4 part by weight of bundle-type carbon nanotubes (specific surface area was 650 $m^2/g$) composed of single-walled carbon nanotube units having an average diameter of 1.5 nm and an average length of 5 μm and 0.6 part by weight of carboxymethyl cellulose (weight-average molecular weight: 100,000 g/mol, degree of substitution: 1.0) were mixed in 99.0 parts by weight of N-methyl pyrrolidone (NMP), as a dispersion medium, to prepare a mixed solution so that a solid content was 1.0 wt %. After the mixed solution was added to a homogenizer, a pressure of 1,000 Bar was applied to the mixed solution to sequentially pass the mixed solution through a first nozzle having a diameter of 200 mm and a second nozzle having a diameter of 500 μm.

The conductive agent dispersion thus prepared included a carbon nanotube structure having a form in which 2 to 5,000 single-walled carbon nanotube units were bonded side by side to each other. In the conductive agent dispersion, an amount of the carbon nanotube structure was 0.4 wt %, and an amount of the carboxymethyl cellulose was 0.6 wt %.

Preparation Example 2: Preparation of Conductive Agent Dispersion

A conductive agent dispersion was prepared in the same manner as in Preparation Example 1 except that, in Preparation Example 1, the weight-average molecular weight of carboxymethyl cellulose was changed to 400,000 g/mol (degree of substitution: 1.0) and, in the homogenizer, a pressure of 500 Bar was applied to the mixed solution to sequentially pass the mixed solution through a first nozzle having a diameter of 300 mm and a second nozzle having a diameter of 800 μm. In the conductive agent dispersion, an amount of the carbon nanotube structure having a form, in which 2 to 5,000 single-walled carbon nanotube units were bonded side by side to each other, was 0.4 wt %, and an amount of the carboxymethyl cellulose was 0.6 wt %.

Preparation Example 3: Preparation of Conductive Agent Dispersion

A conductive agent dispersion was prepared in the same manner as in Preparation Example 1 except that, in Preparation Example 1, the weight-average molecular weight of carboxymethyl cellulose was changed to 100,000 g/mol (degree of substitution: 1.0) and, in the homogenizer, a pressure of 2,000 Bar was applied to the mixed solution to sequentially pass the mixed solution through a first nozzle having a diameter of 200 mm and a second nozzle having a diameter of 500 μm. In the conductive agent dispersion, an amount of the single-walled carbon nanotube units was 0.2 wt %, and an amount of the carboxymethyl cellulose was 1.2 wt %. The carbon nanotube structures shown in Preparation Examples 1 and 2 were not detected.

Preparation Example 4: Preparation of Conductive Agent Dispersion 4.0 part by weight of bundle-type carbon nanotubes (specific surface area was 185 $m^2/g$) composed of multi-walled carbon nanotube units having an average diameter of 10 nm and an average length of 1 μm and 0.6 part by weight of carboxymethyl cellulose (weight-average molecular weight: 100,000 g/mol, degree of substitution: 1.0) were mixed in 99.0 parts by weight of N-methyl pyrrolidone (NMP), as a dispersion medium, to prepare a mixed solution so that a solid content was 5.2 wt %. After the mixed solution was added to a homogenizer, a pressure of 500 Bar was applied to the mixed solution to sequentially pass the mixed solution through a first nozzle having a diameter of 300 mm and a second nozzle having a diameter of 800 μm. In the conductive agent dispersion, an amount of the multi-walled carbon nanotube units (average diameter: 10 nm) was 0.4 wt %, and an amount of the carboxymethyl cellulose was 0.6 wt %. The carbon nanotube structures shown in Preparation Examples 1 and 2 were not detected.

EXAMPLES AND COMPARATIVE EXAMPLES

Example 1: Preparation of Negative Electrode

A silicon-based active material and artificial graphite were used as a negative electrode active material. The silicon-based active material was composed of SiO and a carbon coating layer disposed on the SiO, and had an average particle diameter ($D_{50}$) of 6.6 μm. The artificial graphite had an average particle diameter ($D_{50}$) of 21 μm. The negative electrode active material, a styrene butadiene rubber (SBR) and carboxymethyl cellulose (CMC) (weight-average molecular weight: 100,000 g/mol, degree of substitution: 1.0), as a binder, and the conductive agent dispersion of Preparation Example 1 were mixed to prepare a negative electrode slurry (solvent: $H_2O$). A weight ratio of the negative electrode active material particles, the binder, and the carbon nanotube structure was 96.75:3.2:0.05. A weight ratio of the SiO to the artificial graphite was 5:95, and a weight ratio of the SBR to the CMC was 2.0:1.2.

The negative electrode slurry was coated on a 20 μm thick copper (Cu) metal thin film, as a negative electrode collector, with a loading of 160 mg/25 $cm^2$ and dried. In this case, a temperature of circulating air was 70° C. Subsequently, the negative electrode collector coated with the slurry and dried was roll-pressed and dried in a vacuum oven at 130° C. for 8 hours to prepare a negative electrode including a negative electrode active material layer (see A of FIG. 2 and A of FIG. 3).

The carbon nanotube structure was included in an amount of 0.05 wt % in the negative electrode active martial layer.

Example 2: Preparation of Negative Electrode

A negative electrode was prepared in the same manner as in Example 1 except that the negative electrode active material, the binder, and the carbon nanotube structure were adjusted so that a weight ratio of the negative electrode active material, the binder, and the carbon nanotube structure in Example 1 was 96.7:3.2:0.1.

Example 3: Preparation of Negative Electrode

Figure 3:
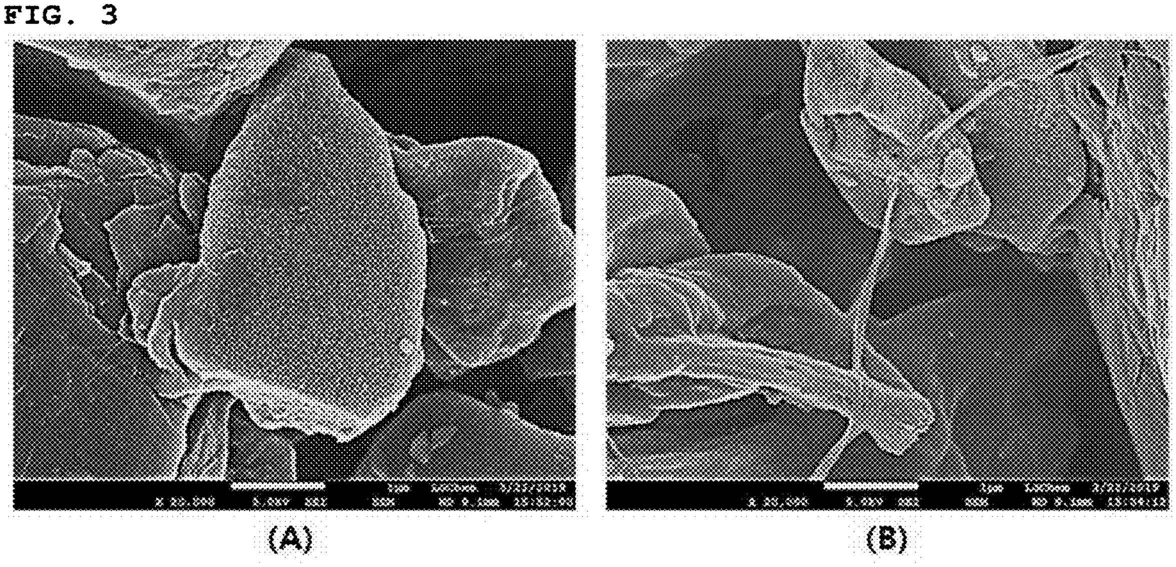
FIG. 3 is an SEM image (A) of the negative electrode of Example 1 and an SEM image (B) of Example 3.

A negative electrode was prepared in the same manner as in Example 1 except that the conductive agent dispersion of Preparation Example 2 was used in Example 1 instead of the conductive agent dispersion of Preparation Example 1 (see B of FIG. 3).

Comparative Example 1: Preparation of Negative Electrode

Figure 4:
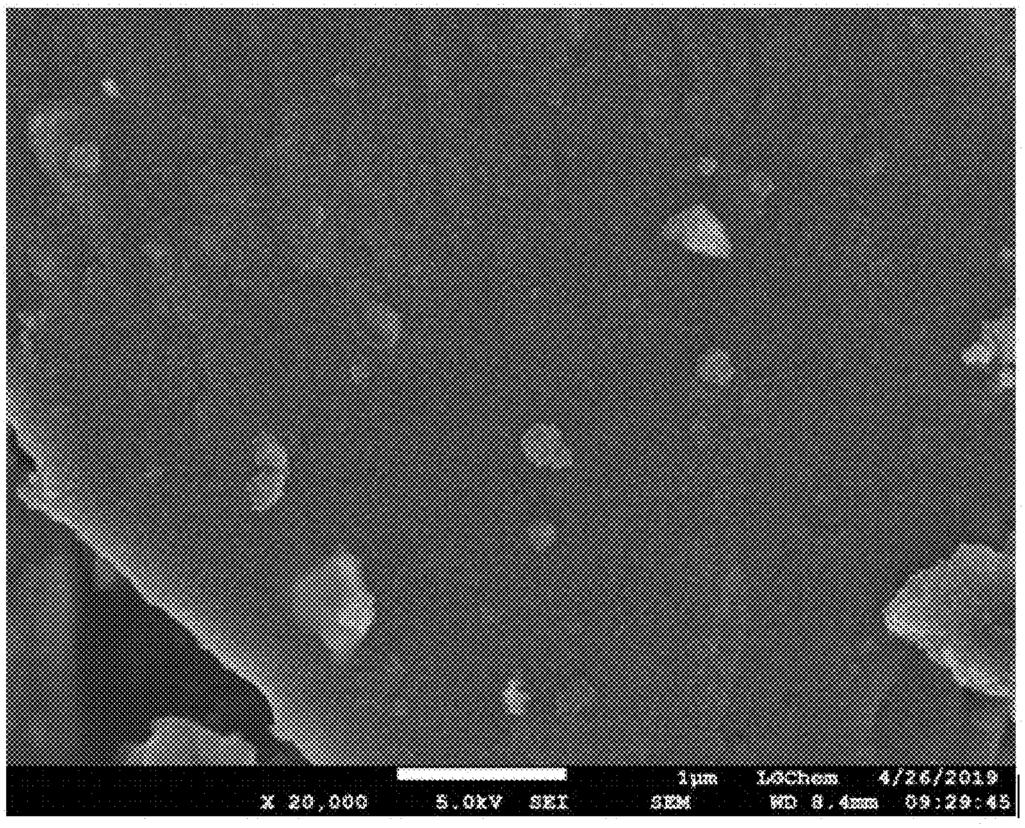
FIG. 4 is an SEM image of a negative electrode of Comparative Example 1.

A negative electrode was prepared in the same manner as in Example 1 except that the conductive agent dispersion of Preparation Example 3 was used in Example 1 instead of the conductive agent dispersion of Preparation Example 1 (see FIG. 4).

Comparative Example 2: Preparation of Negative Electrode

Figure 2:
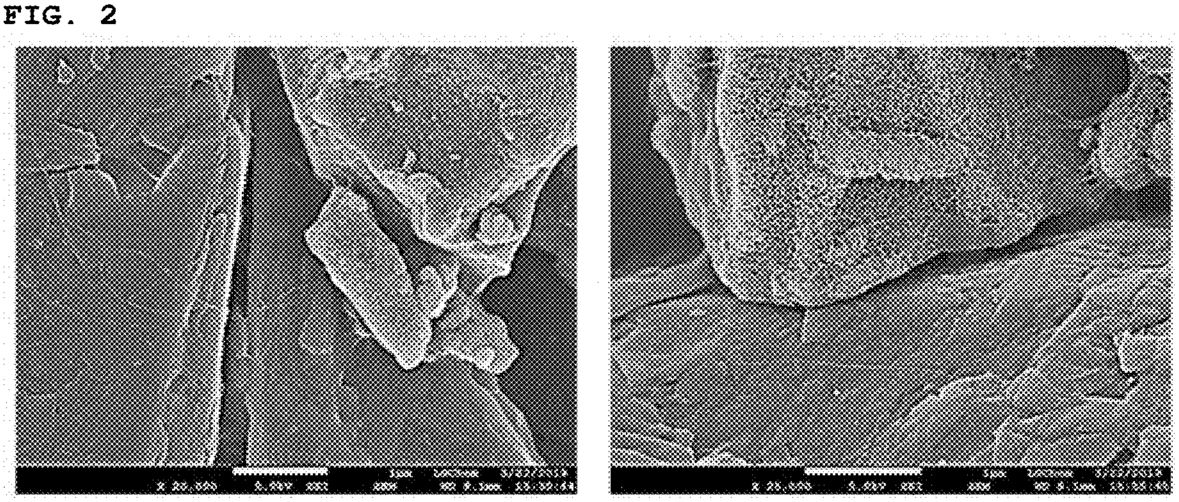
FIG. 2 is SEM images (A) of a negative electrode of Example 1 and SEM images (B) of Comparative Example 2.
Figure 2:
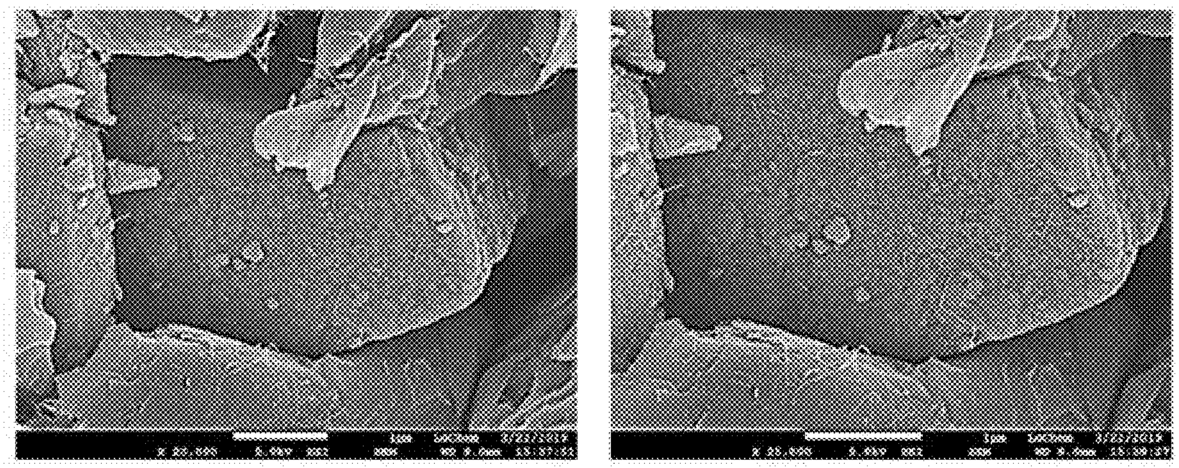

A negative electrode was prepared in the same manner as in Example 1 except that the conductive agent dispersion of Preparation Example 4 was used instead of the conductive agent dispersion of Preparation Example 1, and a weight ratio of the negative electrode active material, the binder, and the multi-walled carbon nanotube units was 95.8:3.2:1.0 in Example 1 (see B of FIG. 2).

Comparative Example 3: Preparation of Negative Electrode (1) Preparation of Carbon Black Dispersion 0.4 part by weight of carbon black (Imerys Graphite & Carbon, Super C65) having an average particle diameter of 35 nm and 0.6 part by weight of carboxymethyl cellulose (weight-average molecular weight: 100,000 g/mol, degree of substitution: 1.0) were mixed in 99.0 parts by weight of water, as a dispersion medium, to prepare a mixed solution so that a solid content was 1.0 wt %. After the mixed solution was added to a homogenizer, a pressure of 500 Bar was applied to the mixed solution to sequentially pass the mixed solution through a first nozzle having a diameter of 300 mm and a second nozzle having a diameter of 800 μm. In the conductive agent dispersion, an amount of the carbon black was 0.4 wt %, and an amount of the carboxymethyl cellulose was 0.6 wt %.

(2) Preparation of Negative Electrode

Thereafter, a negative electrode was prepared in the same manner as in Example 1 except that the above conductive agent dispersion was used instead of the conductive agent dispersion of Preparation Example 1, and a weight ratio of the negative electrode active material, the binder, and the carbon black was 95.8:3.2:1.0.

Comparative Example 4: Preparation of Negative Electrode

A negative electrode was prepared in the same manner as in Example 1 except that the conductive agent dispersion of Preparation Example 4 and the carbon black dispersion used in Comparative Example 3 were used, and a weight ratio of the negative electrode active material, the binder, the multi-walled carbon nanotube units, and the carbon black was 95.8:3.2:0.15:0.85.

TABLE 1

| | Example 1 | Example 2 | Example 3 | Comparative Example 1 | Comparative Example 2 | Comparative Example 3 | Comparative Example 4 |
|---|---|---|---|---|---|---|---|
| Conductive agent specific surface area ($m^2$/g) | 650 | 650 | 650 | 650 | 185 | 65 | — |
| Conductive agent amount (wt %) | 0.05 (carbon nanotube structure) | 0.10 (carbon nanotube structure) | 0.05 (carbon nanotube structure) | 0.05 (single-walled carbon nanotube units) | 1.0 (multi-walled carbon nanotube units) | 1.0 (carbon black) | 1.0 (0.85 carbon black + 0.15 multi-walled carbon nanotube units) |

TABLE 1-continued

| | Example 1 | Example 2 | Example 3 | Comparative Example 1 | Comparative Example 2 | Comparative Example 3 | Comparative Example 4 |
|---|---|---|---|---|---|---|---|
| Average diameter (nm) of carbon nanotube units (for Examples 1 to 3, it means average diameter of units in carbon nanotube structure) | 1.5 | 1.5 | 1.5 | 1.5 | 10 | 35 (carbon black particle (diameter | 35 (carbon black particle diameter), 10 diameter) of carbon nanotube unit) |
| Average diameter (nm) of carbon nanotube structure | 10 | 10 | 100 | — (no structure) | — (no structure) | — (no structure) | — (no structure) |
| Average length (μm) of carbon nanotube structure | Greater than 8.2 | Greater than 8.2 | Greater than 15.6 | Less than 1.8 (single-walled carbon nanotube units) | Less than 1.3 (multi-walled carbon nanotube units) | — | Less than 1.0 (multi-walled carbon nanotube units) |
| Carboxymethyl cellulose amount (wt %) | 1.2 | 1.2 | 1.2 | 1.2 | 1.2 | 1.2 | 1.2 |
| Solid content of negative electrode slurry (wt %) | 40.0 | 40.0 | 40.0 | 40.0 | 40.0 | 40.0 | 40.0 |

The average diameter and average length of the carbon nanotube structure and the average diameter of the carbon nanotube units correspond to average values of top 100 carbon nanotube structures or single-walled carbon nanotube units having a large diameter or length and bottom 100 carbon nanotube structures or single-walled carbon nanotube units having a small diameter or length when the prepared negative electrodes were observed by a transmission electron microscope (TEM).

Experimental Example 1: Observation of Negative Electrode

The negative electrode active material layers of the negative electrodes of Examples 1 and 3 and Comparative Example 1 were observed with a scanning electron microscope.

Referring to A of FIG. 2, with respect to Example 1, it may be understood that a carbon nanotube structure in the form of a long rope with flexibility well formed a conductive network in the negative electrode. In contrast, referring to B of FIG. 2, multi-walled carbon nanotube units were formed in a short length, and the carbon nanotube structure in the form of a long rope with flexibility as in Example 1 was not observed.

In the negative electrode of Comparative Example 1, since the single-walled carbon nanotube units having a diameter of 1.5 nm were present in a completely dispersed state, no carbon nanotube structure was observed, and it was difficult to accurately observe the single-walled carbon nanotube unit with the resolution of the scanning electron microscope (SEM) because the single-walled carbon nanotube units were present as a single strand.

Referring to A of FIG. 3, a carbon nanotube structure in the form of a rope having a diameter of about 10 nm of Example 1 was observed, and, referring to B of FIG. 3, a carbon nanotube structure in the form of a rope having a diameter of about 100 nm of Example 3 was observed.

The carbon nanotube structures of Examples 1 to 3 (image for Example 2 was not attached) were in the form of a rope and were connected to each other in the negative electrode active material layer to represent a network structure.

Experimental Example 2: Battery Life Characteristics Evaluation

Batteries were respectively prepared as follows by using the negative electrodes of Examples 1 to 3 and Comparative Examples 1 to 4.

Li $[Ni_{0.6}Mn_{0.2}Co_{0.2}]O_2$ was used as a positive electrode active material. The positive electrode active material, carbon black as a conductive agent, and polyvinylidene fluoride (PVdF), as a binder, were mixed in a weight ratio of 94:4:2 in an N-methyl-2-pyrrolidone solvent to prepare a positive electrode slurry.

The positive electrode slurry prepared was coated on a 15 μm thick aluminum metal thin film, as a positive electrode collector, and dried. In this case, a temperature of circulating air was 110° C. Subsequently, the coated and dried positive electrode collector was roll-pressed and dried in a vacuum oven at 130° C. for 2 hours to form a positive electrode active material layer.

Each of the negative electrodes of Examples 1 to 3 and Comparative Examples 1 to 4, the above-prepared positive electrode, and a porous polyethylene separator were assembled by using a stacking method, and an electrolyte solution (ethylene carbonate (EC)/ethyl methyl carbonate (EMC)=1/2 (volume ratio), lithium hexafluorophosphate ($LiPF_6$ 1 mol)) was injected into the assembled battery to prepare a lithium secondary battery.

Charge and discharge of each lithium secondary battery were performed under the following conditions.

Charging conditions: charged at a constant current of 0.5 C to 4.25 V, and subsequently charged at 4.2 V until the current flowed at a rate of 0.1 C Discharging conditions: discharged at a current rate of 0.5 C to 2.8 V When the above charging and discharging were set as one cycle, 100 cycles were performed at 45° C. Thereafter, discharge capacity (capacity retention) after 100 cycles was evaluated based on discharge capacity after one cycle at 100% and present in Table 2.

TABLE 2

| | Example 1 | Example 2 | Example 3 | Comparative Example 1 | Comparative Example 2 | Comparative Example 3 | Comparative Example 4 |
|---|---|---|---|---|---|---|---|
| Capacity retention (%) | 94.1 | 95.4 | 93.2 | 87.7 | 88.3 | 86.2 | 86.9 |

Referring to Table 1, with respect to Examples 1 to 3 including the carbon nanotube structure, it may be understood that life characteristics of the batteries were better than those of the comparative examples. The reason for this is that a decrease in capacity retention due to the volume expansion of the silicon-based active material may be suppressed by the presence of the carbon nanotube structure in the negative electrode.

When Example 1 and Example 3 were compared, it may be understood that a case where the diameter of the carbon nanotube structure was 10 nm exhibited a higher battery capacity retention than a case where the diameter of the carbon nanotube structure was 100 nm.

The invention claimed is:

1. A negative electrode, comprising:

a negative electrode active material layer comprising a negative electrode active material and a conductive agent, wherein the negative electrode active material comprises a silicon-based active material, wherein the conductive agent comprises a carbon nanotube structure comprising a plurality of single-walled carbon nanotube units bonded together, wherein an average diameter of the carbon nanotube structure ranges from 10 nm to 100 nm, and wherein a plurality of carbon nanotube structures are connected to each other to form a conductive network structure in the negative electrode active material layer, and the conductive network structure comprises carbon nanotube structures attached to silicon-based active material particles of the silicon-based active material.

2. The negative electrode of claim 1, wherein the conductive network structure connects the silicon-based active material particles to each other to suppress cracks in the negative electrode active material resulting from a volume change of the silicon-based active material during operation of a battery comprising the negative electrode.

3. The negative electrode of claim 1, wherein the plurality of single-walled carbon nanotube units are bonded side by side in the carbon nanotube structure.

4. The negative electrode of claim 1, wherein the single-walled carbon nanotube units, are bonded side by side in a parallel arrangement in the carbon nanotube structure.

5. The negative electrode of claim 1, wherein each single-walled carbon nanotube unit has an average diameter ranging from 0.5 nm to 10 nm.

6. The negative electrode of claim 1, wherein the silicon-based active material particles comprise SiOx (0≤x<2).

7. The negative electrode of claim 1, wherein the carbon nanotube structure has an average length ranging from 1 μm to 100 μm.

8. The negative electrode of claim 1, wherein each single-walled carbon nanotube unit has an average length ranging from 1 μm to 100 μm.

9. The negative electrode of claim 1, wherein each single-walled carbon nanotube unit has a specific surface area ranging from 500 m2/g to 1,000 m2/g.

10. The negative electrode of claim 1, wherein the silicon-based active material has an average particle diameter (D50) ranging from 0.1 μm to 20 μm.

11. The negative electrode of claim 1, wherein the silicon-based active material further comprises a carbon coating layer.

12. The negative electrode of claim 1, wherein the negative electrode active material layer further comprises a carbon-based active material.

13. The negative electrode of claim 12, wherein a weight ratio of the silicon-based active material to the carbon-based active material ranges from of 0.5:99.5 to 20:80.

14. The negative electrode of claim 1, wherein the negative electrode active material layer further comprises carboxymethyl cellulose.

15. A secondary battery comprising the negative electrode of claim 1.

16. The secondary battery of claim 15, wherein the secondary battery has a capacity retention rate of more than 93.2% at 100 cycles, wherein the capacity retention is measured by charging the secondary battery at 45° C. at a constant current of 0.5 C to 4.25 V, then charging at 4.2 V until a current flows at a rate of 0.2 C, and then discharging at a current of 0.5° C. to 2.8 V.

17. A method of preparing a negative electrode, comprising:

preparing a conductive agent dispersion (S1);

forming a negative electrode slurry including the conductive agent dispersion and a negative electrode active material (S2); and forming a negative electrode active material layer by drying the negative electrode slurry, wherein the preparing of the conductive agent dispersion (S1) comprises:

preparing a mixed solution containing a dispersion medium, a dispersant, and single-walled carbon nanotubes (S1-1); and dispersing the single-walled carbon nanotubes by applying a shear force to the mixed solution to form a carbon nanotube structure in which a plurality of single-walled carbon nanotube units are bonded together (S1-2), wherein an average diameter of the carbon nanotube structure ranges from 10 nm to 100 nm, wherein the negative electrode active material comprises silicon-based active material particles, and wherein a plurality of carbon nanotube structures are connected to each other to form a conductive network structure in the negative electrode active material layer, and the conductive network structure comprises the carbon nanotube structures attached to the silicon-based active material particles.

18. The method of claim 17, wherein the step of S1-2 is performed in a homogenizer, and a pressure applied to the mixed solution in the homogenizer ranges from 500 bar to 1,800 bar.

19. The method of claim 17, wherein the dispersant comprises carboxymethyl cellulose, and the carboxymethyl cellulose has a weight-average molecular weight ranging from 50,000 g/mol to 150,000 g/mol.

20. The method of claim 17, wherein the silicon-based active material particles comprise SiOx ($0 \leq x < 2$).

* * * * *